United States Patent
Ishimatsu et al.

(10) Patent No.: US 10,712,636 B2
(45) Date of Patent: Jul. 14, 2020

(54) POLARIZATION ACQUISITION APPARATUS, IMAGE CAPTURING APPARATUS AND IMAGE CAPTURING SYSTEM

(71) Applicant: CANON KABUSHIKI KAISHA, Tokyo (JP)

(72) Inventors: Rie Ishimatsu, Utsunomiya (JP); Kazuhiko Momoki, Koshigaya (JP); Yutaka Yamaguchi, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/189,037

(22) Filed: Jun. 22, 2016

(65) Prior Publication Data

US 2016/0370688 A1    Dec. 22, 2016

(30) Foreign Application Priority Data

Jun. 22, 2015  (JP) .................................. 2015-124769

(51) Int. Cl.
*H04N 5/232* (2006.01)
*G02B 5/30* (2006.01)
(Continued)

(52) U.S. Cl.
CPC ........... *G03B 17/14* (2013.01); *G02B 5/3025* (2013.01); *G02B 27/281* (2013.01);
(Continued)

(58) Field of Classification Search
CPC .. H04N 5/23209; G03B 5/00; G03B 2205/00; G03B 11/00; G03B 17/14; G02B 27/281;
(Continued)

(56) References Cited

U.S. PATENT DOCUMENTS 8,004,675 B2 *  8/2011  Lefaudeux ................ G01J 4/04
                                                        356/364
8,259,067 B2 *  9/2012  Butterworth ......... G02B 27/288
                                                        345/157
(Continued)

FOREIGN PATENT DOCUMENTS

JP    H06160940 A    6/1994
JP    07244237 A    9/1995
(Continued)

OTHER PUBLICATIONS

Office Action issued in Japanese Appln. No. 2015-124769 dated Feb. 5, 2019. English Translation provided.
(Continued)

*Primary Examiner* — Ngoc Yen T Vu
(74) *Attorney, Agent, or Firm* — Rossi, Kimms & McDowell LLP

(57) ABSTRACT

The polarization acquisition apparatus is configured to allow an image capturing system including an interchangeable lens and an image capturing apparatus to perform image capturing using polarized light. The polarization acquisition apparatus includes a variable polarization axis element in which a direction of its polarization transmission axis is variable, a driver configured to operate the variable polarization axis element so as to change the direction of the polarization transmission axis, a first mount to which the image capturing apparatus is detachably attachable, and a second mount to which the interchangeable lens is detachably attachable. The driver is configured to operate the variable polarization axis element so as to change the direction of the polarization transmission axis to at least three directions when the image capturing is performed multiple times.

18 Claims, 8 Drawing Sheets

(51) Int. Cl.
  *G02B 27/28* (2006.01)
  *G03B 17/14* (2006.01)
  *G03B 5/00* (2006.01)
  *H04N 5/225* (2006.01)
(52) U.S. Cl.
  CPC ......... *G02B 27/286* (2013.01); *G02B 27/288* (2013.01); *G03B 5/00* (2013.01); *H04N 5/23209* (2013.01); *G03B 2205/00* (2013.01); *H04N 5/2254* (2013.01)
(58) Field of Classification Search
  CPC .. G02B 27/283; G02B 27/286; G02B 27/288; G02B 5/30; G02B 5/3025; G02B 5/3041; G02B 5/20
  USPC .................................................. 348/340, 342
  See application file for complete search history.

(56) References Cited

U.S. PATENT DOCUMENTS

| | | | |
|---|---|---|---|
| 8,508,646 B2 | 8/2013 | Katerberg | |
| 8,913,113 B2 * | 12/2014 | Kanamori | A61B 1/00009 348/65 |
| 2012/0319222 A1 | 12/2012 | Ozawa et al. | |
| 2014/0362200 A1 * | 12/2014 | Kanamori | A61B 1/0638 348/70 |
| 2017/0075050 A1 * | 3/2017 | Yamagata | G03B 11/00 |

FOREIGN PATENT DOCUMENTS

| | | | | |
|---|---|---|---|---|
| JP | 11041514 | A | 2/1999 | |
| JP | 2003167267 | A | 6/2003 | |
| JP | 2009232347 | A | 10/2009 | |
| JP | 2010121935 | A | 6/2010 | |
| JP | 2010124011 | A | 6/2010 | |
| JP | 2011029903 | A | 2/2011 | |
| JP | 2011040839 | A | 2/2011 | |
| JP | 2011-191469 | * | 9/2011 | ............. G03B 17/14 |
| JP | 2011191469 | A | 9/2011 | |
| JP | 2012080065 | A | 4/2012 | |
| JP | 2012513607 | A | 6/2012 | |
| JP | 2014042126 | A | 3/2014 | |
| JP | 2014182328 | A | 9/2014 | |
| JP | 2014236243 | A | 12/2014 | |
| JP | 2015035735 | A | 2/2015 | |
| JP | 2016520859 | A | 7/2016 | |
| WO | 2009147814 | A1 | 12/2009 | |
| WO | 2010074719 | A1 | 7/2010 | |
| WO | 2014165698 | A1 | 10/2014 | |

OTHER PUBLICATIONS

Office Action issued in Japanese Application No. 2015-124769 dated Jun. 25, 2019. English translation provided.

Office Action issued in Japanese Appln No. 2015-124769 dated Oct. 29, 2019. English translation provided.

* cited by examiner

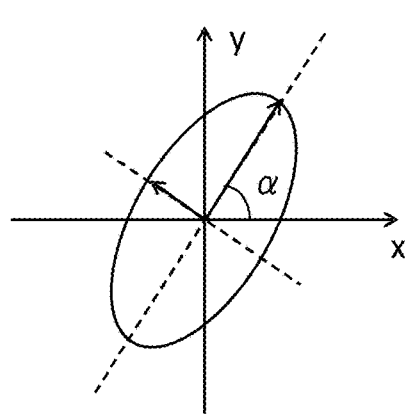 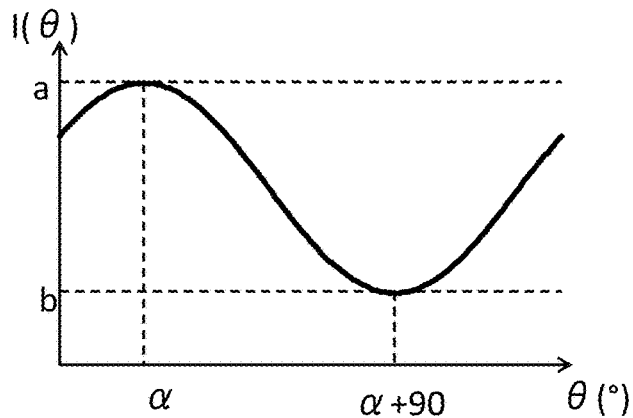
FIG. 5A    FIG. 5B
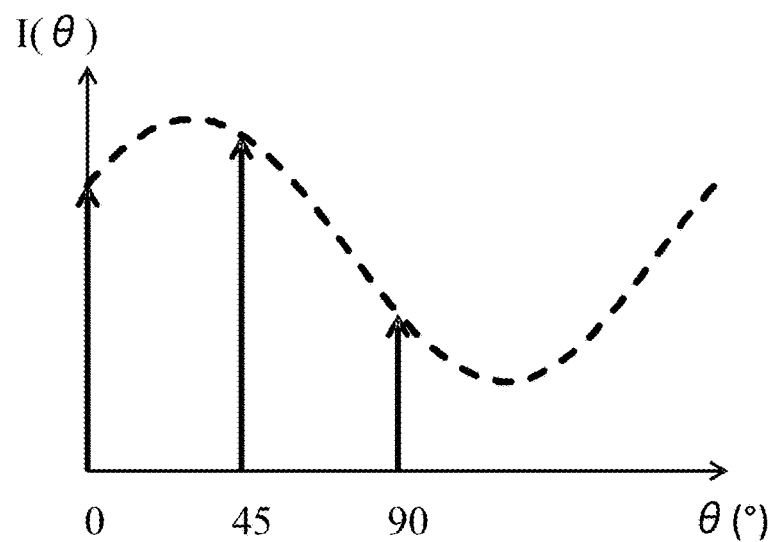
FIG. 6

POLARIZATION ACQUISITION APPARATUS, IMAGE CAPTURING APPARATUS AND IMAGE CAPTURING SYSTEM

BACKGROUND OF THE INVENTION

Field of the Invention

The present invention relates to a polarization acquisition apparatus used to acquire polarization information from captured images.

Description of the Related Art

Rotating a polarizing filter provided on an image capturing optical path enables controlling an amount of light reflected by an object. For example, when image capturing of an underwater object is performed, removing a reflected light from a water surface by the polarizing filter enables providing an image in which the object is clearly image-captured. Moreover, when image capturing of trees is performed, reducing a reflected light from leaves enables providing a colorful image.

Japanese Patent Laid-Open No. 2011-191469 discloses an intermediate lens barrel attached between a camera and an interchangeable lens and provided with a polarizing filter and a mechanism rotating the filter. Japanese Patent Laid-Open No. 2009-232347 discloses a camera that acquires multiple images while rotating a polarizing filter or inserting and removing the filter into and from an optical path to change a degree of a polarizing filter effect.

On the other hand, Japanese Patent Laid-Open No. 11-041514 discloses a camera capable of removing, by using polarization information acquired from a captured image, a specular reflection component from the captured image. Furthermore, Japanese Patent Laid-Open No. 2012-080065 discloses an image sensor provided with a wire-grid polarizer to make polarized lights whose polarization directions are mutually different enter multiple pixels, thereby being capable of extracting polarization information including mutually different items.

However, the polarizing filters disclosed in Japanese Patent Laid-Open Nos. 2011-191469 and 2009-232347 can only adjust their polarizing filter effects on one captured image uniformly, that is, cannot provide mutually different polarizing filter effects on mutually different areas of the captured image. In addition, image capturing using these polarizing filters makes it impossible to adjust their polarizing filter effects on the captured image after the image capturing.

Moreover, the cameras disclosed in Japanese Patent Laid-Open Nos. 11-041514 and 2012-080065 each need to be a camera dedicated for acquiring the polarization information and to use illumination light dedicated therefore, which restricts objects to be image-captured and image capturing conditions.

SUMMARY OF THE INVENTION

The present invention provides a polarization acquisition apparatus capable of making it possible to acquire polarization information of captured images after image capturing, without restricting objects to be image-captured and image capturing conditions, and provides an image capturing apparatus and system using the polarization acquisition apparatus, thereby being capable of producing another image than the captured image.

The present invention provides as an aspect thereof a polarization acquisition apparatus is configured to allow an image capturing system including an interchangeable lens and an image capturing apparatus to perform image capturing using polarized light. The polarization acquisition apparatus includes a variable polarization axis element in which a direction of its polarization transmission axis is variable, a driver configured to operate the variable polarization axis element so as to change the direction of the polarization transmission axis, a first mount to which the image capturing apparatus is detachably attachable, and a second mount to which the interchangeable lens is detachably attachable. The driver is configured to operate the variable polarization axis element so as to change the direction of the polarization transmission axis to at least three directions when the image capturing is performed multiple times.

The present invention provides as another aspect thereof an image capturing apparatus used with the above polarization acquisition apparatus and an image capturing system including the image capturing apparatus and the above polarization acquisition apparatus. The image capturing apparatus is configured to perform the image capturing multiple times while changing the direction of the polarization transmission axis to the at least three directions to produce multiple captured images.

Further features and aspects of the present invention will become apparent from the following description of exemplary embodiments with reference to the attached drawings.

BRIEF DESCRIPTION OF THE DRAWINGS

FIGS. 5A and 5B illustrate a directional dependency of amplitudes of polarized lights.

FIG. 6 illustrates a measurement example.

FIGS. 11A to 11C illustrates examples of images produced by using polarization information a.

DESCRIPTION OF THE EMBODIMENTS

Embodiment 1

Figure 1A:
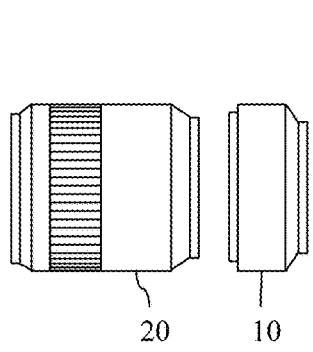
FIGS. 1A and 1B illustrate an example of attachment of a polarization acquisition apparatus, which is Embodiment 1 of the present invention, to an image capturing system.
Figure 1B:
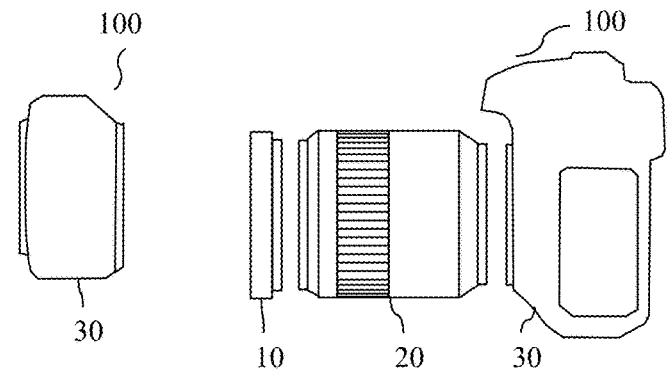

FIGS. 1A and 1B illustrate a use example of a polarization acquisition apparatus 10, which is a first embodiment (Embodiment 1) of the present invention, in a lens-interchangeable image capturing system (hereinafter referred to as "a camera system") 100. The camera system 100 includes a digital camera body 30 and an interchangeable lens 20. The polarization acquisition apparatus 10 is attached (mounted), for example as illustrated in FIG. 1A, between the camera body 30 and the interchangeable lens 20. Alternatively, the polarization acquisition apparatus 10 may be attached to, for example as illustrated in FIG. 1B, a front end (object side end) of the interchangeable lens 20.

It is desirable that the polarization acquisition apparatus 10 be provided with a mount to which at least one of the camera body 30 and the interchangeable lens 20 is detachably attachable. Providing such a mount enables a user to attach the polarization acquisition apparatus 10 to various types of camera bodies 30 and interchangeable lenses 20 as needed. That is, providing the mount enables acquiring polarization information from all captured images acquirable by image capturing using the various types of camera bodies 30 and interchangeable lenses 20, with no restriction on objects to be image-captured and image capturing conditions. Moreover, using the acquired polarization information enables producing an image having a different texture from those of the captured images.

The polarization acquisition apparatus 10 is constituted by at least one variable polarization axis element, an element driver configured to change a state of the variable polarization axis element and an element controller configured to control the driver. The element driver and the element controller constitute a driver configured to operate the variable polarization axis element.

The variable polarization axis element has a polarization transmission axis (hereinafter simply referred to as "a transmission axis). The variable polarization axis element transmits a polarized light having a polarization direction (that is, a polarization axis) parallel to a direction of the transmission axis and inhibits transmission of polarized lights having other polarization directions.

The element driver changes the state of the variable polarization axis element to change the direction of the transmission axis (that is, of the polarization axis of the transmitted polarized light) about an optical axis of the interchangeable lens 20, in other words, in a plane orthogonal to the optical axis; the plane is orthogonal to a paper of FIGS. 1A and 1B.

Although the variable polarization axis element may have any configuration, most simply, it may have a configuration using a polarizing plate that transmits a linearly polarized light whose polarization direction is parallel to a direction of a transmission axis of the polarizing plate. When such a polarizing plate is used, the driver rotates the polarizing plate about the optical axis of the interchangeable lens 20 to change the direction of the transmission axis of the polarizing plate.

Figure 2:
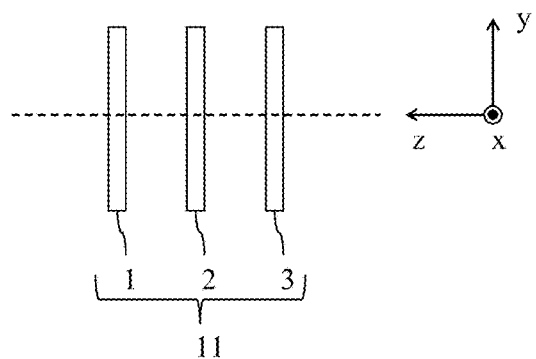
FIG. 2 illustrates an example of a variable polarization axis element used in the polarization acquisition apparatus of Embodiment 1.

A variable polarization axis element 11 may be used that has a configuration illustrated in FIG. 2. This variable polarization axis element 11 uses a wave plate (hereinafter referred to as "a variable phase plate") 2 capable of changing a phase different amount. A z-axis in FIG. 2 indicates the optical axis direction in which the optical axis of the interchangeable lens 20 extends. An xy-plane is orthogonal to the z-axis, and an x-axis and a y-axis are orthogonal to each other. In FIG. 2, a left side corresponds to a light entrance side (object side) of the variable polarization axis element, and a right side corresponds to a light exit side (image side) thereof.

The variable polarization axis element 11 illustrated in FIG. 2 is constituted by, a quarter-wavelength plate 1, the variable phase plate 2 and a polarizing plate 3 arranged in order from the light entrance side (object side). The quarter-wavelength plate 1 and the polarizing plate 3 are arranged such that a slow axis or a fast axis (each hereinafter referred to as "a principal axis") of the quarter-wavelength plate 1 is parallel to a polarization transmission axis of the polarizing plate 3. The polarization transmission axis of the polarizing plate is hereinafter also simply referred to as "a transmission axis". "Being parallel" means not only being strictly parallel, but also being deviated from being strictly parallel within a range that can be regarded as parallel. The quarter-wavelength plate 1 and the variable phase plate 2 are arranged such that a principal axis of the quarter-wavelength plate 1 is tilted by an angle of 45° with respect to a principal axis (slow or fast axis) of the variable phase plate 2. The angle of 45° means not only a strict angle of 45°, but also an angle deviated from the strict angle of 45° within a range that can be regarded as an angle of 45°.

Figure 3A:
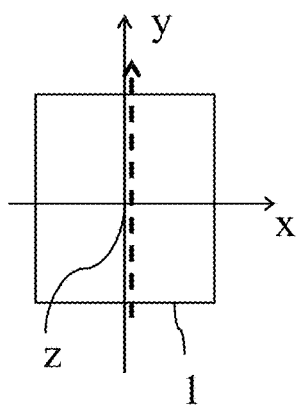
FIGS. 3A to 3C illustrate an axis direction of the variable polarization axis element illustrated in FIG. 2.
Figure 3B:
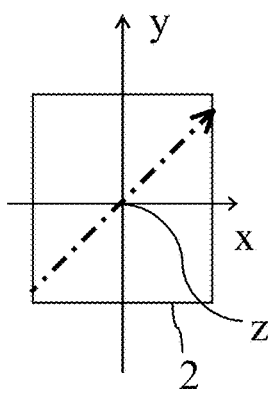
Figure 3C:
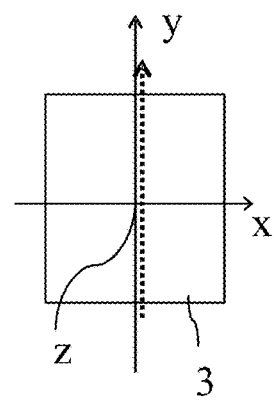

FIG. 3 illustrates an arrangement example of the quarter-wavelength plate 1, the variable phase plate 2 and the polarizing plate 3. In this arrangement example, the principal axis (illustrated by a dashed line) of the quarter-wavelength plate 1 and the transmission axis (illustrated by a dotted line) of the polarizing plate 3 both extend in a 90° direction (y-axis direction), and the principal axis of the quarter-wavelength plate 1 and the principal axis (illustrated by a dashed-dotted line) of the variable phase plate 2 mutually form an angle of 45°.

With these relations, a phase difference Δλ (nm) provided by the variable phase plate 2 and a direction θ of the transmission axis of the variable polarization axis element satisfy following relation:

$$\theta = 90° - \Delta \times 180°$$

where $\Delta = \delta/\lambda$; $\delta$ represents a phase difference (nm), and $\lambda$ represents a wavelength (nm).

For example, when the phase differences are $0\lambda$, $\frac{1}{4}\lambda$, $\frac{1}{2}\lambda$ and $\frac{3}{4}\lambda$, the directions θ of the transmission axis are 90°, 45°, 0° and −45°, respectively. Thus, changing the phase difference provided by the variable phase plate 2, that is, changing the state of the variable polarization axis element enables changing the direction of the transmission axis of the variable polarization axis element.

Next, description will be made of a relation between the phase difference and the direction of the transmission axis, through an example in which the phase difference provided by the variable phase plate 2 is $\frac{1}{4}\lambda$ (corresponding to when the direction of the transmission axis is 45°). FIGS. 4A to 4D illustrate intensities (transmittances) T of transmitted lights when the linearly polarized lights whose polarization directions are respectively 90°, 45°, 0° and −45° enter the variable polarization axis element.

In FIGS. 4A to 4D, the phase difference provided by the variable phase plate 2 is $\frac{1}{4}\lambda$, and the polarization directions of the entering lights (linearly polarized lights) are 90°, 45°, 0° and −45° (135°), respectively. In FIGS. 4A to 4D, a lower side of a paper of these drawings corresponds to the light entrance side, and an upper side thereof corresponds to a light exit side. Dashed arrows in FIGS. 4A to 4D indicate the direction of the principal axis of the quarter-wavelength plate 1, the direction of the principal axis of the variable phase plate 2 and the direction of the transmission axis of the polarizing plate 3.

Figures 4A, 4B, 4C, 4D:
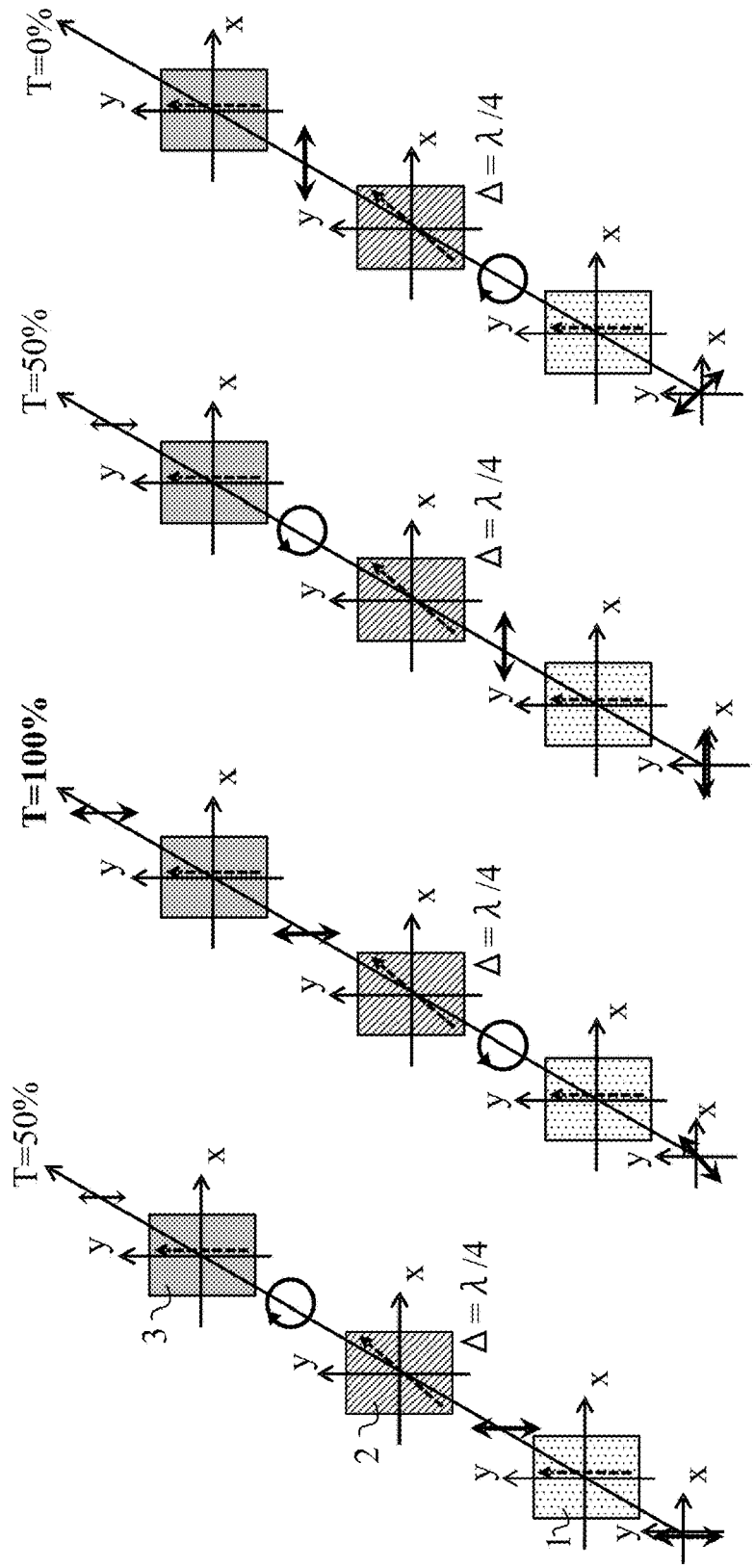
FIGS. 4A to 4D illustrate intensities of light transmitted through the variable polarization axis element illustrated in FIG. 2.

As illustrated in FIG. 4A, when the polarization direction of the entering light is 90°, this polarization direction of the entering light is identical to the direction of the principal axis of the quarter-wavelength plate 1, so that the entering light is transmitted through the quarter-wavelength plate 1, without receiving any influence of the phase difference. The direction of the principal axis of the variable phase plate 2 and the polarization direction of the entering light form an angle of 45°, so that the linearly polarized light having been transmitted through the quarter-wavelength plate 1 receives the phase difference (¼λ) when being transmitted through the variable phase plate 2 and thereby is converted into a circularly polarized light. Of the circularly polarized light, a polarized light component whose polarization direction is identical to the direction of the transmission axis of the polarizing plate 3 is only transmitted through the polarizing plate 3. Therefore, when losses by specular reflection and absorption are ignored, 50 percent of the polarized light entering the variable polarization axis element is transmitted therethrough.

Similarly, in the case of FIGS. 4B, 4C and 4D where the polarization direction of the entering light is changed to 45°, 0° and −45° (135°), 100 percent, 50 percent and 0 percent of the polarized light entering the variable polarization axis element is ideally transmitted therethrough, respectively.

These show that, when the phase difference provided by the variable phase plate 2 is ¼λ, the entering light is transmitted through the variable polarization axis element with an intensity equivalent to that when the entering light is transmitted through the polarizing plate 3 whose transmission axis has a direction of 45°. In other words, when the phase difference provided by the variable phase plate 2 is ¼ λ, the direction of the transmission axis of the variable polarization axis element can be regarded as a 45° direction.

Changing the phase difference provided by the variable phase plate 2 to 0, ½ λ and ¾λ changes the direction of the transmission axis of the variable polarization axis element to 90°, 0° and −45° (135°). In other words, the phase difference Δλ (nm) provided by the variable phase plate 2 and the direction θ (°) of the transmission axis of the variable polarization axis element satisfy the above-described relation of:

$$\theta = 90° - \Delta \times 180°.$$

When the variable phase plate 2 is used in the variable polarization axis element, the element driver has, in order to change the direction of the transmission axis of the variable polarization axis element, a function of changing a state of an optical element included in the variable polarization axis element. For example, when a liquid crystal element is used as the variable phase plate 2, the element driver controls orientation directions of liquid crystal molecules by applying a voltage to change the phase difference, thereby enabling changing the direction of the transmission axis.

Any configuration may be employed to control the element driver. For example, the element driver may be controlled in response to a control signal from the camera body 30. It is necessary for this configuration to provide, to the polarization acquisition apparatus 10, a communicator configured to receive the control signal from the camera body 30 and an element controller configured to control the element driver in response to the control signal. The camera body 30 and the interchangeable lens 20 normally communicate control signals for controlling the interchangeable lens 20, information on a state of the interchangeable lens 20 and others with each other through electronic contacts provided in their mounts. Thus, it is only necessary to provide an electronic contact as the communicator to the polarization acquisition apparatus 10 so as to enable communication with the camera body 30 and the interchangeable lens 20. Alternatively, instead of providing the electronic contact, a sender/receiver for wireless LAN such as Wi-Fi™ may be provided as the communicator to each of the polarization acquisition apparatus 10 and the camera body 30 in order to enable communication therebetween.

As the control signal from the camera body 30, for example, a release signal as an image capturing start signal output in response to a user's operation (release operation) of an image capturing instruction button may be used. The camera body 30 may perform, in response to each reception of the release signal, image capturing and change the direction of the transmission axis of the variable polarization axis element or may perform, in response to reception of one release signal, image capturing multiple times while sequentially changing the direction of the transmission axis of the variable polarization axis element to predetermined multiple directions.

After each image capturing, it is desirable to send information on the direction of the transmission axis (that is, of the polarization axis of the transmitted polarized light) from the polarization acquisition apparatus 10 to the camera body 30 to cause the camera body 30 to store an acquired captured image and the information on the direction of the transmission axis in association with each other. Alternatively, the camera body 30 may store together multiple captured images acquired by performing image capturing multiple times while changing the direction of the transmission axis in association with the directions of the transmission axis.

The image capturing system of this embodiment performs image capturing at least three times with mutually different directions of the transmission axis and acquires polarization information from at least three acquired captured images (image data).

Next, description will be made of a principle of acquisition of the polarization information in this embodiment, through an example in which a reflected light from an object is expressed as illustrated in FIGS. 5A and 5B.

An ellipse in FIG. 5A indicates a directional dependency of amplitudes of polarized lights. FIG. 5B illustrates a light intensity I(θ) of the polarized light at an angle θ from the x-axis. In FIG. 5A, dashed lines represent a long axis and a short axis of the ellipse, and α represents an angle (direction) between the long axis and the x-axis.

Moreover, arrows represent amplitudes in a long axis direction and a short axis direction. A square of the amplitude represented by the arrow in each of the long and short axis directions provides a light intensity of the polarized light (hereinafter also referred to as "polarization intensity"). The square of the amplitude in the long axis direction corresponds to "a" (maximum polarization intensity) in FIG. 5B, and the square of the amplitude in the short axis direction corresponds to "b" (minimum polarization intensity). The polarization information includes the direction α that is a polarization direction in which the maximum polarization intensity is provided, the maximum polarization intensity a and the minimum polarization intensity b.

This example shows a state where a polarized light that vibrates in a direction corresponding to α=30° has the maximum polarization intensity. The light intensity I(θ) satisfies following expression (1) for any θ.

$$I(\theta) = (a-b)\cos^2(\theta - \alpha) + b \tag{1}$$

This means that measuring the light intensities (that is, acquiring captured images) with at least three mutually different directions of the transmission axis of the variable polarization axis element enables calculating α, a and b.

For example, FIG. 6 illustrates light intensities I(θ) respectively measured when the directions θ of the transmission axis of the variable polarization axis element are 0°, 45° and 90°. The light intensity I(θ) changes, as understood from expression (1), with a period of 180°. Thus, it is necessary for calculating α, a and b to acquire at least three image data with at least three mutually different directions θ of the transmission axis when θ is in a range from 0° to less than 180°.

On the other hand, as long as satisfying this condition, there is no restriction on the direction θ with which the image data is acquired. Therefore, it is not necessary to adjust the direction of the transmission axis (polarization direction) while confirming an image before image capturing, and thus image capturing for acquiring at least three image data can be automatically performed under a predetermined condition.

Although a typical polarized light includes information on its light intensity and amplitude, this embodiment acquires information on the direction α and the polarization intensities a and b as the polarization information. Although the direction α and the polarization intensities a and b in the polarization information may be separately stored, it is desirable that the direction α and the polarization intensities a and b be stored in association with the image data having been used to calculate these values.

As described above, using the polarization acquisition apparatus 10 of this embodiment enables acquiring the polarization information from the captured images after image capturing, with no restriction on the objects to be image-captured and the image capturing conditions.

In addition, using the acquired polarization information α, a and b enables producing an image (hereinafter referred to as "a texture changed image") having a different texture from those of the captured images. The texture herein corresponds to a reflected light from an object to be image-captured. Description will be made of a relation between the polarization information and the reflected light from in producing the texture changed image.

A reflected light from an object (substance) is divided into a specular reflection component directly reflected on a surface of the object and a diffuse reflection component diffusely reflected inside the object or on the surface thereof. The specular reflection component reflects at the surface of the object under Fresnel reflection conditions. In Fresnel reflection, except under some conditions, an S-polarized light has a stronger intensity than that of a P-polarized light. Therefore, in the specular reflection component, a polarization intensity changes depending on directions, that is, has a directional dependency. On the other hand, the diffuse reflection component including lights reflected by the object in various directions has no directional dependency.

Thus, this embodiment considers, in the acquired polarization information, a component "a-b" that changes depending on the direction θ as the specular reflection component and considers a component "b" that does not change depending on the direction θ as the diffuse reflection component. This embodiment calculates the specular reflection component and the diffuse reflection component depending on a purpose to produce the texture changed image. This makes it possible to produce an image including a different reflected light (that is, a different texture) from those of the captured images, without using a dedicated illumination light.

Processes to calculate the polarization information α, a and b from the captured images and to produce the texture changed image by using the polarization information may be performed by an image processor provided in the camera body 30 or by an image processing apparatus, such as a personal computer, provided separately from the camera body 30.

Embodiment 2

Figure 7A:
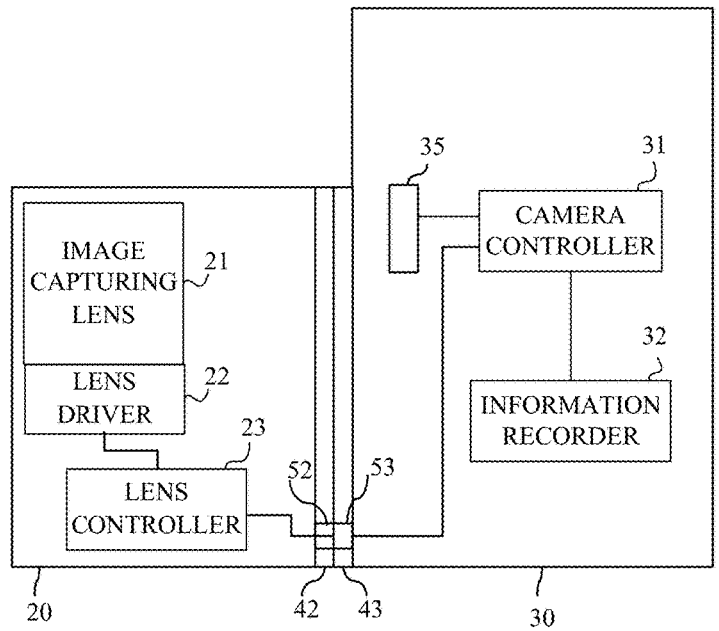
FIGS. 7A and 7B illustrate a configuration of an image capturing apparatus that is Embodiment 2 of the present invention.

Next, description will be made of a specific embodiment according to Embodiment 1, as a second embodiment (Embodiment 2). FIG. 7A illustrates an internal configuration of a camera system constituted by a camera body 30 as an image capturing apparatus and an interchangeable lens 20. In FIG. 7A, the polarization acquisition apparatus 10 described in Embodiment 1 (and described later in more detail) is not included to the camera system.

The interchangeable lens 20 and the camera body 30 are provided with mounts 42 and 43 to make a detachable attachment of the interchangeable lens 20 to the camera body 30 possible. The interchangeable lens includes an image capturing lens 21 as an image capturing optical system, a lens driver 22 and a lens controller 23. The image capturing lens 21 images light (reflected light) from an object to form an object image. The lens driver 22 is configured to perform a focusing drive, a stop drive and others of the image capturing lens 21. The lens controller 23 is configured to control operations of the lens driver 22.

On the other hand, the camera body 30 includes an image sensor 35, a camera controller 31 and an information recorder 32. The image sensor 35 is a photoelectric conversion element, such as a CCD sensor or a CMOS sensor, configured to perform image capturing (photoelectric conversion) of the object image formed by the image capturing lens 21. The camera controller is configured to cause the image sensor 35 to perform the image capturing and configured to produce a captured image from an output signal from the image sensor 35. The information recorder 32 is configured to record the captured image (image data) produced by the camera controller 31.

The lens controller 23 and the camera controller 31 communicate lens information and control signals with each other through communication contacts 52 and 53 provided in the mounts 42 and 43.

Figure 7B:
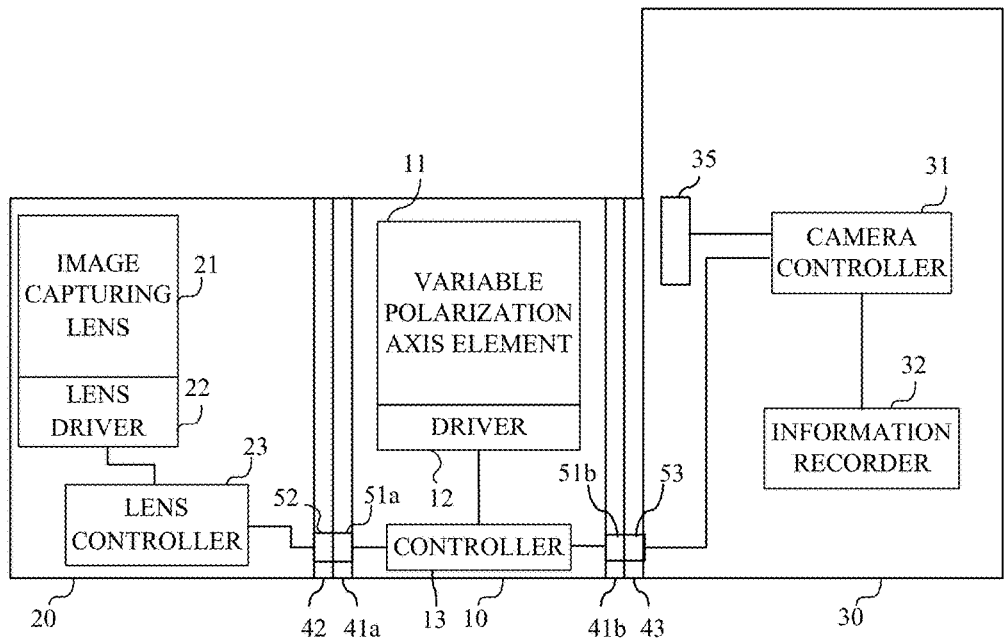

FIG. 7B illustrates an internal configuration of a camera system in which the polarization acquisition apparatus 10 is attached between the camera body 30 and the interchangeable lens 20. The polarization acquisition apparatus 10 has a mount (second mount) 41a detachably attached to the mount 42 of the interchangeable lens 20 and has a mount (first mount) 41b detachably attached to the mount 43 of the camera body 30.

The polarization acquisition apparatus 10 includes the variable polarization axis element 11 described in Embodiment 1, an element driver 12 and an element controller 13. The element driver 12 and the element controller 13 constitute a driver. The element driver 12 is configured to operate the variable polarization axis element 11 so as to change the direction of the transmission axis of the variable polarization axis element 11. The element controller 13 is configured to control operations of the element driver 12, that is, of the variable polarization axis element 11.

The element controller 13 communicates various information with the lens and camera controllers 23 and 31 through communication contacts 51a and 51b provided to the mounts 41a and 41b and the communication contacts 52 and 53 of the interchangeable lens 20 and the camera body 30. The element controller further relays the communication between the lens and camera controllers 23 and 31. As described above, the camera system can perform image capturing not using the polarization acquisition apparatus 10 as illustrated in FIG. 7A and can perform image capturing using the polarization acquisition apparatus 10 as illustrated in FIG. 7B.

The variable polarization axis element 11 includes, as illustrated in FIG. 2, the quarter-wavelength plate 1, the variable phase plate 2 and the polarizing plate 3. The variable phase plate 2 is constituted by a vertical alignment (VA) liquid crystal element.

The element driver 12 is configured to control a voltage applied to the variable phase plate 2 to operate the variable phase plate 2 so as to change orientation directions of liquid crystal molecules, thereby enabling selectively changing the phase difference provided by the variable phase plate 2 to $0\lambda$, $\tfrac{1}{4}\lambda$ and $2/\lambda$. Changing the phase difference enables changing the direction of the transmission axis of the variable polarization axis element 11 to a 90° direction (first direction), a 45° direction (second direction) and a 0° direction (third direction).

The camera body 30 in this embodiment has, as image capturing modes, a first image capturing mode and a second image capturing mode. The first image capturing mode is a mode in which image capturing is performed once in response to one release operation, and the second image capturing mode is a mode in which image capturing is performed multiple times (three times in this embodiment) in response to one release operation.

Description will be made of operations of the polarization acquisition apparatus 10 in the first and second image capturing modes. Description will be herein made of only operations of the polarization acquisition apparatus 10 necessary for acquiring the polarization information, that is, description will not be made of operations not relating to the acquisition of the polarization information, such as operations for relaying the communication between the interchangeable lens 20 and the camera body 30 and relaying control of the interchangeable lens 20 by the camera body 30.

First, description will be made of the operations in the second image capturing mode. In the second image capturing mode, the camera body 30 (camera controller 31) acquires, in response to one release operation, three captured images necessary for acquiring the polarization information. The element controller 13 that has received a release signal generated by the release operation from the camera controller 31 sets the direction of the transmission axis of the variable polarization axis element 11 to the first direction as an initial direction. The initial direction is desirable to be a direction in which energy necessary for driving the variable polarization axis element 11 is minimum. Thus, in this embodiment, the element controller 13 sets, as the initial direction, the 90° direction in which the phase difference is $0\lambda$.

After completion of the setting of the initial direction, the element controller 13 sends, to the camera controller 31, information on the initial direction of the transmission axis and indicating the completion of the setting thereof. The camera controller 31 that has received this information performs first image capturing.

The release signal is generated in response to a full-press operation of the image capturing instruction button that is a two-step operable button. In response to a half-press operation of the image capturing instruction button, the element controller 13 sets the direction of the transmission axis to the initial direction and sends the information on the initial direction and indicating the completion of the setting thereof to the camera controller 31. The camera controller 31 holds this state for a predetermined period of time without starting the first image capturing.

In response to the full-press operation of the image capturing instruction button performed within the predetermined period of time after the setting of the initial direction in response to the half-press operation, the camera controller 31 starts the first image capturing. If the full-press operation of the image capturing instruction button is not performed within the predetermined period of time, the element controller 13 restarts its operation from the setting of the direction of the transmission axis to the initial direction.

This restart of the operation enables acquiring the polarization information even when energization of the polarization acquisition apparatus 10 is stopped because the full-press operation of the image capturing instruction button is not performed within the predetermined period of time.

After completion of the first image capturing, the camera controller 31 sends information indicating the completion of the first image capturing to the element controller 13. The element controller 13 that has received the information indicating the completion of the first image capturing sets the direction of the transmission axis to the second direction and sends information on the second direction and indicating completion of the setting thereof to the camera controller 31.

The camera controller 31 that has received the above information performs second image capturing and sends, after completion of the second image capturing, information indicating the completion thereof to the element controller 13. The element controller 13 that has received the information indicating the completion of the second image capturing sets the direction of the transmission axis to the third direction and sends information on the third direction and indicating completion of the setting thereof to the camera controller 31. The camera controller 31 that has received this information performs third image capturing.

Then, the camera controller 31 stores, to the information recorder 32, three captured images acquired by performing the image capturing three times and the information on the first to third directions received from the element controller 13 in association with one another.

Next, description will be made of the operations in the first image capturing mode. In the first image capturing mode, the element and camera controllers 13 and 31 divisionally perform the operations performed in the second image capturing mode.

The polarization acquisition apparatus 10 holds, in its internal memory (not illustrated), information on the direction of the transmission axis of the variable polarization axis element 11. In response to a user's selection of the first image capturing mode in the camera body 30, the camera controller 31 sends information indicating that the first image capturing mode is set to the element controller 13.

The element controller 13 that has received this information stores information on the initial direction (first direction) to the internal memory, sets the direction of the transmission axis of the variable polarization axis element 11 to the initial direction stored in the internal memory and holds this state for a predetermined period of time.

In response to the full-press operation of the image capturing instruction button performed within the predetermined period of time, the camera controller 31 performs first image capturing. After completion of the first image capturing, the camera controller 31 stores a captured image and the information on the initial direction stored in the internal memory of the element controller 13 and received therefrom in association with each other. In addition, the camera controller 31 sends information indicating the completion of the first image capturing to the element controller 13. The element controller 13 that has received this information changes the direction of the transmission axis to the second direction before next image capturing, holds this state for the predetermined period of time and stores information on the second direction to the internal memory.

In response to the full-press operation of the image capturing instruction button performed within the predetermined period of time, the camera controller 31 performs second image capturing. After completion of the second image capturing, the camera controller 31 stores a captured image and the information on the second direction stored in the internal memory of the element controller 13 and received therefrom in association with each other. Furthermore, the camera controller 31 sends information indicating the completion of the second image capturing to the element controller 13. The element controller 13 that has received this information changes the direction of the transmission axis to the third direction before next image capturing, holds this state for the predetermined period of time and stores information on the third direction to the internal memory.

Then, in response to the full-press operation of the image capturing instruction button performed within the predetermined period of time, the camera controller 31 performs third image capturing. After completion of the third image capturing, the camera controller 31 stores a captured image and the information on the third direction stored in the internal memory of the element controller 13 and received therefrom in association with each other. Thereafter, the element controller 13 changes the direction of the transmission axis to the initial direction.

If the full-press operation of the image capturing instruction button is not performed within the predetermined period of time, the camera controller stops energization of the polarization acquisition apparatus 10. When the full-press operation of the image capturing instruction button is performed after the predetermined period of time in the first image capturing mode, the element controller 13 stores the initial direction and sets the direction of the transmission axis to the initial direction, as in a case where the first image capturing mode is newly selected. Thereby, if the full-press operation of the image capturing instruction button is not performed within the predetermined period of time, next image capturing is performed from a state where the direction of the transmission axis is set to the initial direction.

As described above, in each of the first and second image capturing modes, it is necessary for acquiring the polarization information to perform image capturing three times so as to acquire three captured images. The acquired three captured images can be used not only to acquire the polarization information, but also as images for recording.

Figure 8C:
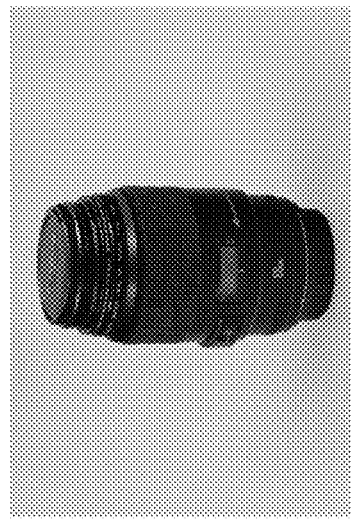
FIGS. 8A to 8C illustrate examples of captured images.
Figure 8B:
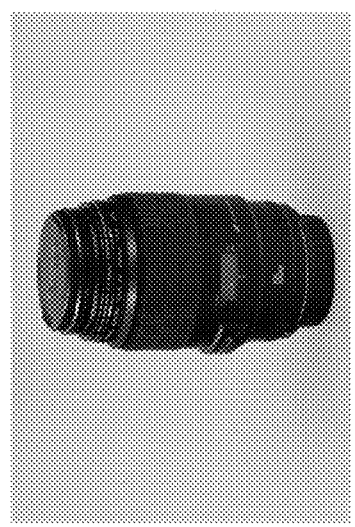
Figure 8A:

FIGS. 8A, 8B and 8C illustrate examples of three captured images acquired by the first image capturing, second image capturing and third image capturing. The three captured images illustrated in FIGS. 8A, 8B and 8C respectively correspond to when the phase differences provided by the variable phase plate 2 are $0\lambda$, $\frac{1}{4}\lambda$ and $\frac{1}{2}\lambda$, that is, when the directions of the transmission axis are the 90°, 45° and 0° directions. Moreover, although FIGS. 8A, 8B and 8C illustrate monochrome images, these images are actually color images. This applies to texture changed images illustrated in FIGS. 9 to 12F, which will be described below.

Figure 9:
FIG. 9 illustrates an example of an image produced by using polarization information b.
Figure 10:
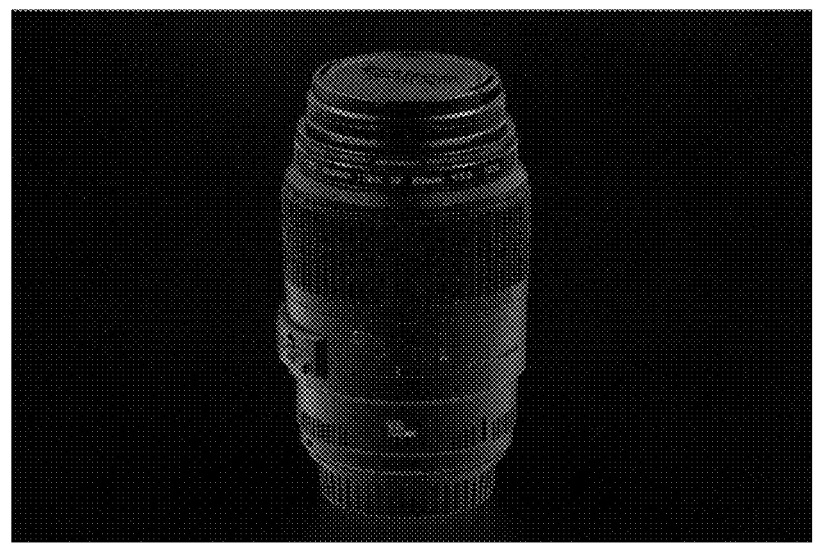
FIG. 10 illustrates an example of an image produced by using polarization information a-b.
Figure 11A:
Figure 11B:
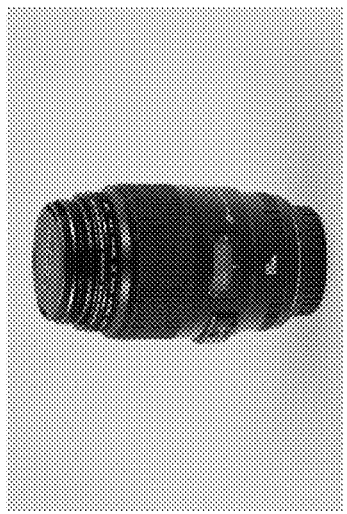
Figure 11C:
Figure 12A:
FIGS. 12A to 12F illustrates examples of images produced by using $\alpha$, a and b with mutually different $\theta$.
Figure 12B:
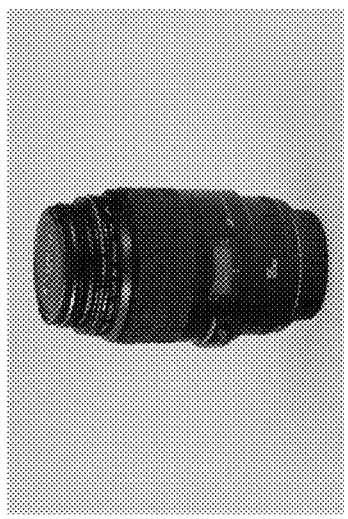
Figure 12C:
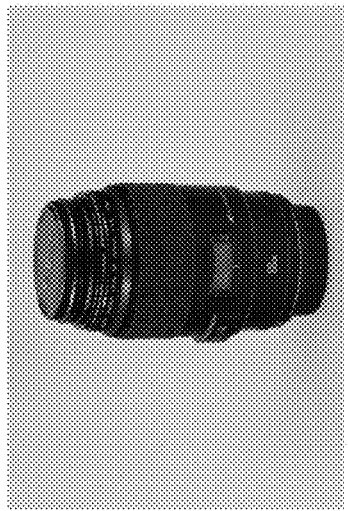
Figure 12D:
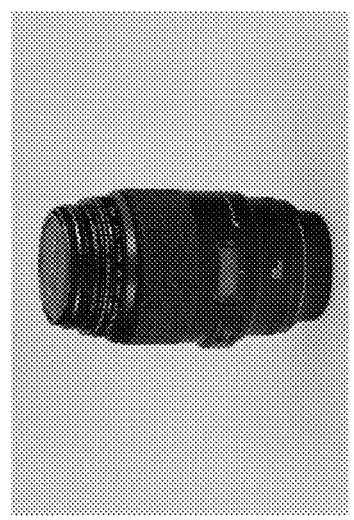
Figure 12E:
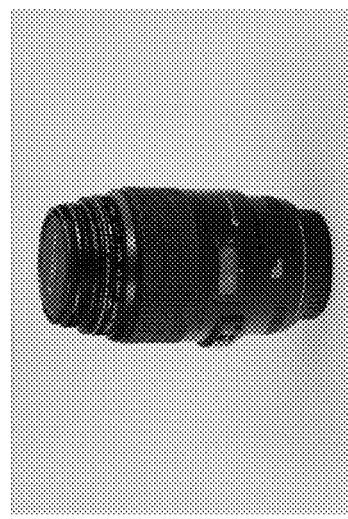
Figure 12F:

FIGS. 9 to 12F illustrate texture changed images produced by using the polarization information a, a and b calculated from the captured images illustrated in FIGS. 8A, 8B and 8C. The texture changed image illustrated in FIG. 9 is produced by using the diffuse reflection component b. The texture changed image illustrated in FIG. 10 is produced by using the specular reflection component a-b. The texture changed images illustrated in FIGS. 11A, 11B and 11C are respectively produced by adding 50 percent, 100 percent and 150 percent of the specular reflection component a-b to the diffuse reflection component b. That is, the texture changed images illustrated in FIGS. 11A, 11B and 11C are produced by using the following expression where $I_x$ represents a pixel value of the texture changed image, and x represents 0.5, 1.0 and 1.5.

$$I_x = x \cdot (a-b) + b.$$

As understood from comparison of the captured images illustrated in FIGS. 8A to 8C with the texture changed images illustrated in FIGS. 9 to 11C, each texture changed image includes a more glossy object surface than that included in each captured image.

FIGS. 12A to 12F illustrate texture changed images produced by using the polarization information acquired by changing the direction (angle) θ in expression (1) to 0°, 30°, 60°, 90°, 120° and 150°. As understood from these images, producing texture changed images by using the polarization information acquired with mutually different directions θ enables producing a texture changed image corresponding to an arbitrary direction of the transmission axis, which is a different direction from those in acquiring captured images.

Although each of FIGS. 10 to 12F illustrates a texture changed image produced by performing a uniform process over the entire image, mutually different processes may be performed on partial areas of the image. For example, when one image includes multiple objects, mutually different processes may be respectively performed on these objects.

Moreover, although this embodiment uses the VA liquid crystal element as the variable phase plate 2, different liquid crystal elements may be used depending on characteristics required for the variable phase plate 2. For example, a TN liquid crystal element or an OCB liquid crystal element may be used.

Furthermore, although this embodiment described the case of changing the direction of the transmission axis of the variable polarization axis element 11 in acquiring the captured images to the three directions whose angles are 90°, 45° and 0°, captured images may be acquired with other directions or four or more directions of the transmission axis.

Each of the above-described embodiments enables realizing a polarization acquisition apparatus capable of acquiring polarization information from captured images after image capturing, with no restrictions on object to be image-captured and image capturing conditions. Using the polarization information acquired by this polarization acquisition apparatus makes it possible to produce an image different from the captured images.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-124769, filed on Jun. 22, 2015, which is hereby incorporated by reference herein in its entirety.

What is claimed is:

1. An adapter apparatus configured to allow an image capturing system including an interchangeable lens and an image capturing apparatus to perform image capturing using polarized light, the adapter apparatus comprising:
   a variable polarization axis element in which a direction of its polarization transmission axis is variable;
   a driver configured to operate the variable polarization axis element so as to change the direction of the polarization transmission axis;
   a communicator configured to communicate with the image capturing apparatus;
   a first mount to which the image capturing apparatus is detachably attachable; and
   a second mount to which the interchangeable lens is detachably attachable,
   wherein the driver operates the variable polarization axis element so as to change the direction of the polarization transmission axis to at least three directions when the image capturing is performed multiple times, and
   wherein the communicator is configured to send information indicating a completion of setting the direction of the polarization transmission axis to an initial direction in response to a half-press operation of an image capturing instruction button of the image capturing system to the image capturing apparatus.

2. The adapter apparatus according to claim 1, wherein the communicator is configured to send information on the direction of the polarization transmission axis in the image capturing to the image capturing apparatus such that the information is stored in association with an captured image produced by that image capturing.

3. The adapter apparatus according to claim 1, wherein the variable polarization axis element includes in order from a side of the second mount:
   a quarter-wavelength plate;
   a variable phase plate configured to change a phase difference; and
   a polarizing plate,
   wherein a direction of a principal axis of the variable phase plate is tilted with respect to a direction of a principal axis of the quarter-wavelength plate and with respect to a direction of a polarization transmission axis of the polarizing plate, and
   wherein the driver operates the variable phase plate so as to change the phase difference provided by the variable phase plate to change the direction of the polarization transmission axis of the variable polarization axis element.

4. The adapter apparatus according to claim 3, wherein the variable phase plate is a phase plate using liquid crystals.

5. The adapter apparatus according to claim 1, wherein the variable polarization axis element includes in order from a side of the second mount:
   a polarizing plate; and
   a quarter-wavelength plate,
   wherein a polarization transmission axis of the polarizing plate is tilted with respect to a direction of a principal axis of the quarter-wavelength plate, and
   wherein the driver rotates the variable polarization axis element to change the direction of the polarization transmission axis of the variable polarization axis element.

6. An image capturing apparatus configured to perform image capturing using the adapter apparatus according to claim 1,
   wherein the image capturing apparatus is configured to perform the image capturing multiple times, while changing the direction of the polarization transmission axis to the at least three directions, to produce multiple captured images.

7. The image capturing apparatus according to claim 6, wherein the image capturing apparatus is configured to acquire, from the multiple captured images, polarization information including a maximum polarization intensity, a minimum polarization intensity and a polarization direction in which the maximum polarization intensity is provided.

8. The image capturing apparatus according to claim 7, wherein the image capturing apparatus is configured to produce, by using the polarization information, another image than the captured images.

9. The adapter apparatus according to claim 1, wherein the communicator is configured to receive information indicating a completion of the image capturing from the image capturing apparatus.

10. The adapter apparatus according to claim 1, wherein the initial direction is a direction in which energy necessary for operating the variable polarization axis element is minimum among predetermined directions.

11. The adapter apparatus according to claim 1, wherein the communicator receives an image capturing start signal from the image capturing apparatus and the driver operates the variable polarization axis element depending on the image capturing start signal.

12. An image capturing system comprising:
   the adapter apparatus according to claim 1;
   an image capturing apparatus detachably attachable to the adapter apparatus through the first mount; and
   an interchangeable lens detachably attachable to the adapter apparatus through the second mount,
   wherein the image capturing apparatus is configured to perform the image capturing multiple times, while changing the direction of the polarization transmission axis to the at least three directions, to produce multiple captured images.

13. The image capturing system according to claim 12, wherein the image capturing apparatus is configured to acquire, from the multiple captured images, polarization information including a maximum polarization intensity, a minimum polarization intensity and a polarization direction in which the maximum polarization intensity is provided.

14. The image capturing system according to claim 13, wherein the image capturing apparatus is configured to produce, by using the polarization information, another image than the captured images.

15. An adapter apparatus configured to allow an image capturing system including an interchangeable lens and an image capturing apparatus to perform image capturing using polarized light, the adapter apparatus comprising:
  a variable polarization axis element in which a direction of its polarization transmission axis is variable;
  a driver configured to operate the variable polarization axis element so as to change the direction of the polarization transmission axis;
  a communicator configured to communicate with the image capturing apparatus;
  a first mount to which the image capturing apparatus is detachably attachable; and
  a second mount to which the interchangeable lens is detachably attachable,
  wherein the driver operates the variable polarization axis element so as to change the direction of the polarization transmission axis to at least three directions when the image capturing is performed multiple times, and
  wherein the communicator is configured to send information indicating a completion of setting of the direction of the polarization transmission axis to the image capturing apparatus.

16. An adapter apparatus configured to allow an image capturing system including an interchangeable lens and an image capturing apparatus to perform image capturing using polarized light, the adapter apparatus comprising:
  a variable polarization axis element in which a direction of its polarization transmission axis is variable;
  a driver configured to operate the variable polarization axis element so as to change the direction of the polarization transmission axis;
  a communicator configured to communicate with the image capturing apparatus;
  a first mount to which the image capturing apparatus is detachably attachable; and
  a second mount to which the interchangeable lens is detachably attachable,
  wherein the driver operates the variable polarization axis element so as to change the direction of the polarization transmission axis to at least three directions when the image capturing is performed multiple times, and
  wherein the communicator is configured to control the driver so as to set the direction of the polarization transmission axis to an initial direction in response to a half-press operation of an image capturing instruction button of the image capturing system.

17. The adapter apparatus according to claim 16, wherein the communicator is configured to control the driver so as to set the direction of the polarization transmission axis to an initial direction in a case where a full-operation of the image capturing instruction button is not performed within a predetermined period of time after the half-press operation of the image capturing instruction button.

18. An adapter apparatus configured to allow an image capturing system including an interchangeable lens and an image capturing apparatus to perform image capturing using polarized light, the adapter apparatus comprising:
  a variable polarization axis element in which a direction of its polarization transmission axis is variable;
  a driver configured to operate the variable polarization axis element so as to change the direction of the polarization transmission axis;
  a communicator configured to communicate with the image capturing apparatus;
  a first mount to which the image capturing apparatus is detachably attachable; and
  a second mount to which the interchangeable lens is detachably attachable,
  wherein the driver operates the variable polarization axis element so as to change the direction of the polarization transmission axis to at least three directions when the image capturing is performed multiple times, and
  wherein the communicator is configured to send information on the direction of the polarization transmission axis in the image capturing to the image capturing apparatus such that the information is stored in association with an captured image produced by that image capturing.

* * * * *